United States Patent
Zhao et al.

(10) Patent No.: US 7,126,911 B2
(45) Date of Patent: Oct. 24, 2006

(54) TIMER ROLLOVER HANDLING MECHANISM FOR TRAFFIC POLICING

(75) Inventors: Yongdong Zhao, Plano, TX (US); Craig A. Lindahl, McKinney, TX (US)

(73) Assignee: Integrated Device Technology, Inc., Santa Clara, CA (US)

( * ) Notice: Subject to any disclaimer, the term of this patent is extended or adjusted under 35 U.S.C. 154(b) by 819 days.

(21) Appl. No.: 09/923,221

(22) Filed: Aug. 6, 2001

(65) Prior Publication Data

US 2003/0037159 A1  Feb. 20, 2003

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. .................................... 370/230; 370/235
(58) Field of Classification Search ............... 709/232, 709/226; 370/229, 230, 236, 230.1, 395.21, 370/232, 235, 236.2
See application file for complete search history.

(56) References Cited

U.S. PATENT DOCUMENTS

| | | | | |
|---|---|---|---|---|
| 5,381,407 A | * | 1/1995 | Chao | 370/233 |
| 5,649,110 A | * | 7/1997 | Ben-Nun et al. | 370/351 |
| 5,666,353 A |   | 9/1997 | Klausmeier et al. | |
| 5,668,797 A | * | 9/1997 | Fahmi et al. | 370/229 |
| 5,818,815 A | * | 10/1998 | Carpentier et al. | 370/230.1 |
| 6,108,303 A | * | 8/2000 | Fahmi et al. | 370/230 |
| 6,157,614 A | * | 12/2000 | Pasternak et al. | 370/236 |
| 6,359,911 B1 | * | 3/2002 | Movshovich et al. | 370/536 |
| 6,377,583 B1 | * | 4/2002 | Lyles et al. | 370/412 |
| 6,529,474 B1 | * | 3/2003 | Bonneau et al. | 370/230 |
| 2002/0031086 A1 | * | 3/2002 | Welin | 370/229 |
| 2004/0057376 A1 | * | 3/2004 | Sasvari et al. | 370/230 |

OTHER PUBLICATIONS

"An Asynchronous Transfer Mode (ATM) Tutorial," An ATM Tutorial, printed from http://www.sci.pfu.edu.ru/telesys/studwork/telfut96/Isdn/atm/tute.html on Apr. 6, 2001, 18 pages.
"Nortel's Asynchronous Transfer Mode (ATM) Portfolio," Nortel Networks, Aug. 3, 2000, 44 pages.

* cited by examiner

Primary Examiner—John Follansbee
Assistant Examiner—Dustin Nguyen
(74) Attorney, Agent, or Firm—Robert C. Kowert; Meyertons, Hood, Kivlin, Kowert & Goetzel, P.C.

(57) ABSTRACT

A network device may perform traffic policing to determine if incoming data cells are in conformance with policing parameters, including a theoretical arrival time (TAT), for each cell's communication channel. Each cell may have an arrival time according to a timer value. The timer value and TAT may rollover upon reaching a maximum value. The network device may be configured to account for such rollovers when determining cell conformance. For each communication channel, a table entry may include the policing parameters and rollover data. Each entry may also include operations and maintenance (OAM) data. The rollover data indicates the rollover phase relationship between the timer value and TAT parameter for each channel. The rollover data may be updated each rollover phase of the timer, for example as part of an OAM table scan process. The network device may be an Asynchronous Transfer Mode (ATM) traffic policing device or switch.

32 Claims, 10 Drawing Sheets

| | | | | |
|---|---|---|---|---|
| | 702 | | 704 | 706 |
| VC# 1 | Policing Parameter$_1$ Bits (includes TAT$_1$,I$_1$,L$_1$) | | R-B-V$_1$ Bits | OAM Parameter$_1$ Bits (includes AIS,RDI,CC) |
| VC# 2 | Policing Parameter$_2$ Bits (includes TAT$_2$,I$_2$,L$_2$) | | R-B-V$_2$ Bits | OAM Parameter$_2$ Bits (includes AIS,RDI,CC) |
| VC# 3 | Policing Parameter$_3$ Bits (includes TAT$_3$,I$_3$,L$_3$) | | R-B-V$_3$ Bits | OAM Parameter$_3$ Bits (includes AIS,RDI,CC) |
| ⋮ | ⋮ | | ⋮ | ⋮ |
| VC# 64K | Policing Parameter$_{64K}$ Bits (includes TAT$_{64K}$,I$_{64K}$,L$_{64K}$) | | R-B-V$_{64K}$ | OAM Parameter$_{64K}$ Bits (includes AIS,RDI,CC) |

700

| | 302 | | 304 | | 300 |
|---|---|---|---|---|---|
| Channel 1 | Policing Parameters (e.g. $TAT_1, I_1, L_1$) | $R_1$ | $B_1$ | $V_1$ | |
| Channel 2 | Policing Parameters (e.g. $TAT_2, I_2, L_2$) | $R_2$ | $B_2$ | $V_2$ | |
| Channel 3 | Policing Parameters (e.g. $TAT_3, I_3, L_3$) | $R_3$ | $B_3$ | $V_3$ | |
| ⋮ | ⋮ | | | | |
| Channel n | Policing Parameters (e.g. $TAT_n, I_n, L_n$) | $R_n$ | $B_n$ | $V_n$ | |

| | 702 | 704 | 706 |
|---|---|---|---|
| | Policing Parameter$_1$ Bits (includes TAT$_1$,I$_1$,L$_1$) | R-B-V$_1$ Bits | OAM Parameter$_1$ Bits (includes AIS,RDI,CC) |
| VC# 1 | | | |
| VC# 2 | Policing Parameter$_2$ Bits (includes TAT$_2$,I$_2$,L$_2$) | R-B-V$_2$ Bits | OAM Parameter$_2$ Bits (includes AIS,RDI,CC) |
| VC# 3 | Policing Parameter$_3$ Bits (includes TAT$_3$,I$_3$,L$_3$) | R-B-V$_3$ Bits | OAM Parameter$_3$ Bits (includes AIS,RDI,CC) |
| ⋮ | ⋮ | ⋮ | ⋮ |
| VC# 64K | Policing Parameter$_{64K}$ Bits (includes TAT$_{64K}$,I$_{64K}$,L$_{64K}$) | R-B-V$_{64K}$ Bits | OAM Parameter$_{64K}$ Bits (includes AIS,RDI,CC) |

TIMER ROLLOVER HANDLING MECHANISM FOR TRAFFIC POLICING

BACKGROUND OF THE INVENTION

1. Field of the Invention

This invention relates to traffic policing in communication networks, and more in particular to handling timer and policing parameter rollovers.

2. Description of the Related Art

Various communication technologies exist for transferring data across a network or between a sender and receiver. Some communication technologies may provide for the creation of one or more communication channels or paths. In some communication technologies, data may pass from source to destination through one or more switches or routers. In some applications, it may desirable to limit or police the rate at which data may flow through a particular connection or channel. For example, in broadband communication networks where multiple communication channels are supported, it may be desirable to limit a channel to a particular data rate or bandwidth so that all channels may have a certain quality of service (QoS).

A network device, such as a switch, may provide traffic policing functionality to determine whether communications conform to an allocated bandwidth for each channel handled by the network device. The term "cell" is used herein to refer to any type of data unit, datagram, packet, or other data configuration communicated as a unit through a network. Traffic policing may involve monitoring the amount of data or the number of cells received (e.g. by a switch) during a period of time. If too much data or too many cells are received, some of the cells may be dropped or flagged as non-conforming.

In some traffic policing devices an allowed arrival time or theoretical arrival time may be maintained for each channel. The allowed/theoretical arrival time may be set to determine if data units are arriving too fast (e.g. too closely spaced). If a data unit (e.g. cell) arrives before the allowed/theoretical arrival time, then it may be discarded or flagged as non-conforming. If the data unit arrives after the allowed/theoretical arrival time, then it is passed on and the allowed/theoretical arrival time is incremented.

The traffic policing device may employ one or more counters or timers to track the actual arrival time of data units. For each channel, the traffic policing device may compare the actual arrival time to the allowed/theoretical arrival time. The timer or counter may have a certain bit width and the allowed/theoretical arrival time may be stored as a value having the same bit width as the timer or counter. For example, a 32-bit counter may be used for the timer to track actual arrival times. The allowed/theoretical arrival time may be stored as a 32-bit value.

When the counter reaches its highest value (e.g. FFFFFFFFh for a 32-bit counter), it rolls over and continues from zero. Similarly, the allowed/theoretical arrival time may rollover when it is incremented beyond its maximum value. These rollovers may cause errors in traffic policing if not accounted for. For example, if the allowed/theoretical arrival time value for a channel is large, for example FFFFFFFAh, and the timer counter rolls over, then the arrival time of a data unit may appear small, for example 000000005h. When the arrival time is compared to the allowed/theoretical arrival time, if rollover is not accounted for, the arrival time will appear to be less than the allowed/theoretical arrival time indicating that the data unit arrived too early (when in fact, in this example, it arrived eleven clocks after the allowed/theoretical arrival time). Similarly, if the allowed/theoretical arrival time is incremented beyond its max value so that it rolls over and a data unit arrives before the arrival time counter rolls over, it may appear that the data unit is conforming (since the arrival time appears to be greater than the allowed/theoretical arrival time), when in fact the data unit may have arrived too early.

In some communications systems, the network device, switch, router, etc. that is performing a traffic policing function may be configured to handle a large number of channels. For example, a switch may handle thousands of different channels. The switch may store and maintain a different allowed/theoretical arrival time and other traffic parameters for each channels. The allowed/theoretical arrival time may roll over independently for each channel. Also, a roll over of the arrival time counter may effect all of the channels at once. The more channels handled by a device, the more difficult it may be to account for roll overs of the arrival time counter and the allowed/theoretical arrival time for each channel.

SUMMARY OF THE INVENTION

A network traffic policing device may employ a conformance algorithm to determine whether to accept or discard incoming data cells. For each communication channel handled by the network policing device, policing parameters (e.g. assigned traffic parameters and historical traffic data) may be stored in a memory table for use by the conforming algorithm. When a new data cell is received, the stored data for that cell's communication channel may be retrieved from the table and be used by the conformance algorithm.

The network policing device may include a timer configured to provide a timer value for use by the conformance algorithm in determining whether received cells are conforming or non-conforming. An arrival time from the timer value may be determined for each cell and compared against the policing parameters for the cell's communication channel to decide whether to accept or discard (or flag) an incoming cell. The timer value has a maximum value that, when reached, the timer value starts over at 0 (i.e., rolls over). The network policing device is configured to account for such rollovers of the timer value when comparing a cell's arrival time (a timer value) to the policing parameters. Also, a policing parameter may have a maximum value and may rollover when incremented beyond that maximum value. The network policing device may also be configured to account for rollovers of a policing parameter when determining whether or not a cell is conforming.

Each communication channel entry in the table may also include rollover data configured to indicate a rollover phase relationship between the timer value and a theoretical arrival time policing parameter. The rollover data may indicate for each communication channel if the theoretical arrival time has rolled over ahead of the timer value, is behind the timer value in rollover phase, or is in rollover phase with the timer value. The rollover data may be updated at least once per rollover phase of the timer. The rollover data may also include an indication of the timer phase at the last time the rollover data was updated.

In one embodiment, the network traffic policing device may include a global timer phase indicator. In one embodiment, the global timer phase indicator may be viewed as a 1-bit extension to the global timer. Thus, the global timer phase indicator may be toggled each time the timer rolls over and provides an indication of the current rollover phase of the timer. When accessing a communication channel entry in the table (whether as part of an update process or as part of a traffic policing conformance process) the global timer phase indicator may be compared to the rollover data to determine if the rollover data has been updated for the current phase of the timer.

At least once per timer rollover phase an update process may be performed on the rollover data for each communication channel entry in the table. Also, for each data cell received by the network device, the global timer phase indicator may be compared to the rollover data for that cell's communication channel to determine if the rollover data needs to be updated before the network device determines whether or not the cell is conforming according to its arrival time and policing parameters. Thus, communication channel rollover data entries that have not yet been updated by the update process may be updated before determining whether or not a cell is conforming. After the network device determines whether or not a cell is conforming, the theoretical arrival time policing parameter is updated for that cell's communication channel entry in the table. If the theoretical arrival time update causes the theoretical arrival time value to roll over, then the rollover data for that table entry is updated to reflect the theoretical arrival time value rollover.

In one embodiment the network policing device also performs network operations and maintenance (OAM) activities. Each entry in the table may also include OAM data used in performing the operations and maintenance activities. The network device may perform an OAM table scan periodically in which the OAM data in each table entry is read and possibly modified according to alarm conditions, etc. In one embodiment, since the OAM table scan is performed more frequently than the timer rolls over, the rollover data update process may be performed as part of or in conjunction with the OAM table scan. The network device may include a global timer rollover indicator that is set when the timer rolls over. When a operation and maintenance table scan is initiated, the global timer rollover indicator may be checked to determine if the rollover data has been updated since the last OAM table scan. Thus, if the global timer rollover indicator is set, a rollover data update process is performed with the OAM process for each table entry. Upon completing an entire table scan in which the rollover data is updated, the global timer rollover indicator is cleared.

In one embodiment, a network device may include a cell processing unit configured to receive incoming data cells from a network for a number of communication channels. The network device may have a timer configured to provide a timer value to the cell processing unit. The network device may also include a memory coupled to the cell processing unit and configured to store one or more policing parameters and rollover data for each of the communication channels. The rollover data may include an indication of a rollover relationship between the timer value and one of the policing parameters for each of the communication channels. For each received incoming data cell, the cell processing unit is configured to assign an arrival time from the timer value and compare the received incoming data cell's arrival time to the one or more policing parameters for the received incoming data cell's communication channel to determine if the received incoming data cell is conforming or non-conforming to a rate for the communication channel. The cell processing unit is configured to access the rollover data for the received incoming data cell's communication channel to account for the rollover relationship when comparing the arrival time to the one or more policing parameters.

In one embodiment, the timer is configured to increment the timer value at a predetermined frequency and the timer value rolls over to zero and continues incrementing upon reaching a maximum timer value. The policing parameters may include a theoretical arrival time that may roll over upon being incremented past a maximum value. The rollover data may indicate for each communication channel whether or not the timer value and theoretical arrival time are in the same rollover phase.

In one embodiment, the network device may include a timer rollover phase indicator configured to indicate a current rollover phase of the timer value. The cell processing unit is configured to access the memory to perform an update of the rollover data for each communication channel at least once per rollover phase of the timer value.

BRIEF DESCRIPTION OF THE DRAWINGS

FIG. 7 illustrates a channel table that may include policing parameters, rollover data, and operations and maintenance data for each channel, according to one embodiment;

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
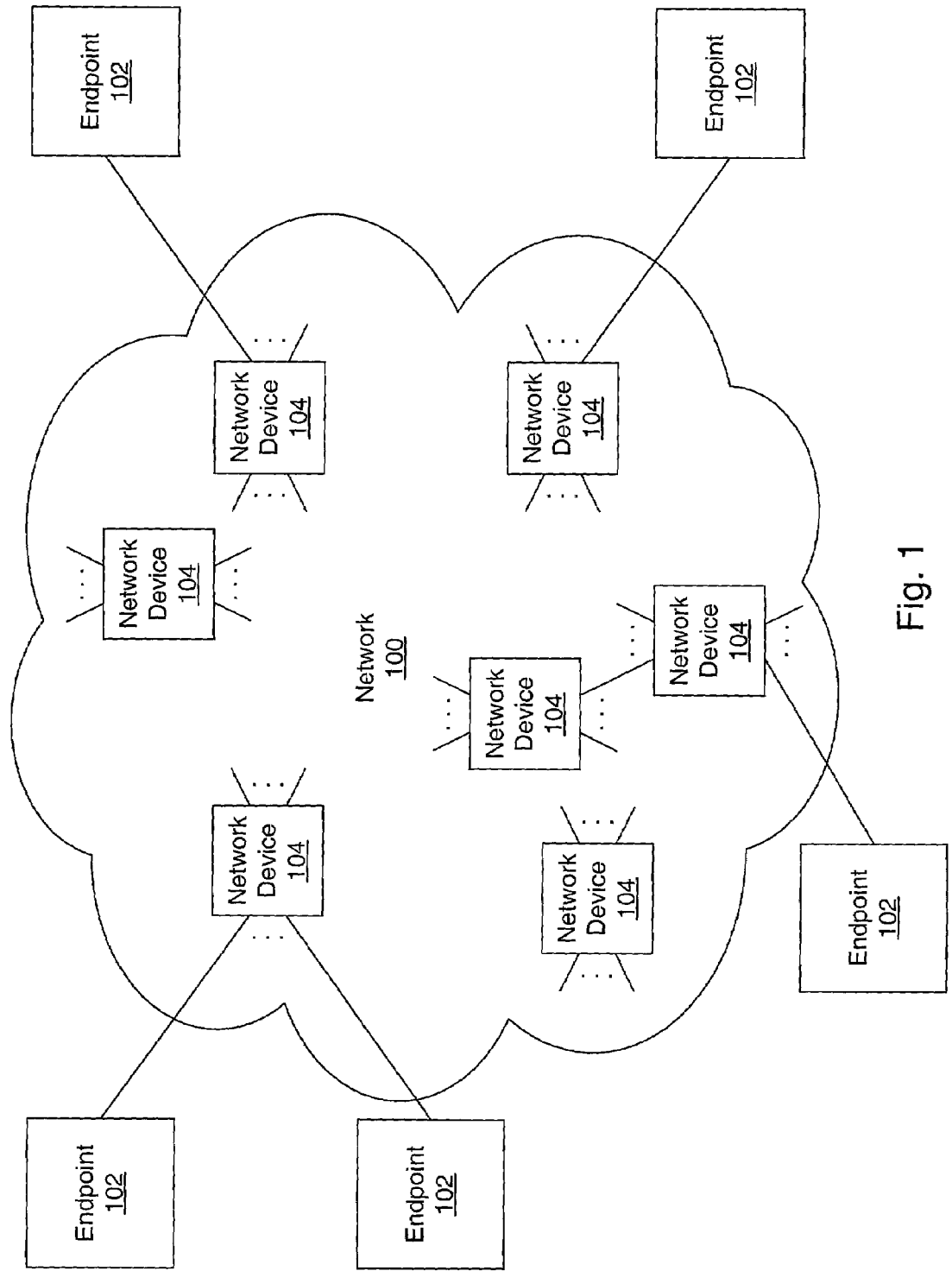
FIG. 1 illustrates an example of a network system, according to one embodiment.

Turning now to FIG. 1, an example of a network system is illustrated. The network system may include various subscribers or endpoints 102 coupled to a network 100. An endpoint 102 may be a subscriber device such as a computer system or telephony device or other type of user device such as a personal digital assistant (PDA), mobile phone, set-top box, workstation, personal computer, or any other endpoint device configured for communicating data through a network to another device. An endpoint device 102 may also be a server or other type of device for supplying data in response to requests received through network 100. Network 100 may include network devices 104 for communicating data transmissions from one endpoint device 102 to another endpoint device 102. Network devices 104 may be routers, switches, mulitplexers, or any other type of device configured for participating in the formation of communication channels in a network.

Each network device 104 may include one or more input ports for coupling to other network devices 104 and/or endpoints 102. Each network device 104 may also include one or more output ports for connecting to one or more other network devices 104 or endpoints 102. An endpoint device 102 may send a data communication to be sent through network 100 to another endpoint 102. The communication may include one or more data units, datagrams, cells, packets, etc. The term "cell" is used herein to refer to any type of data unit, datagram, packet, or other data configuration communicated as a unit through network 100. A network device 104 may receive cells at its input ports and route or switch each cell to it's appropriate output port, for example, according to address information or other routing or switching information included with or within each cell. In some embodiments each physical port on a network device 104 may handle multiple different communication channels (e.g. broadband communication). In other embodiments each physical port may handle only a single communication channel.

Each communication channel handled by a network device 104 may be configured for a certain guaranteed or allowed bandwidth or cell rate. For example, when an endpoint device 102 establishes a communication channel to another endpoint device 102, a cell rate may be negotiated for the communication channel through each network device (e.g. switch, router, etc.). In other embodiments the cell rate or bandwidth may be fixed for certain communication channels or determined by some other means. A network device 104 may need to monitor and police the cell traffic on each channel to handle traffic congestion and/or transmissions exceeding the allowed or negotiated cell rate. For example, a theoretical arrival time may be calculated for a communication channel and the actual arrival time of each cell may be compared to its theoretical arrival time. If a cell arrives too early, the network device 104 may drop the cell or may flag the cell as a non-conforming cell.

Figure 2:
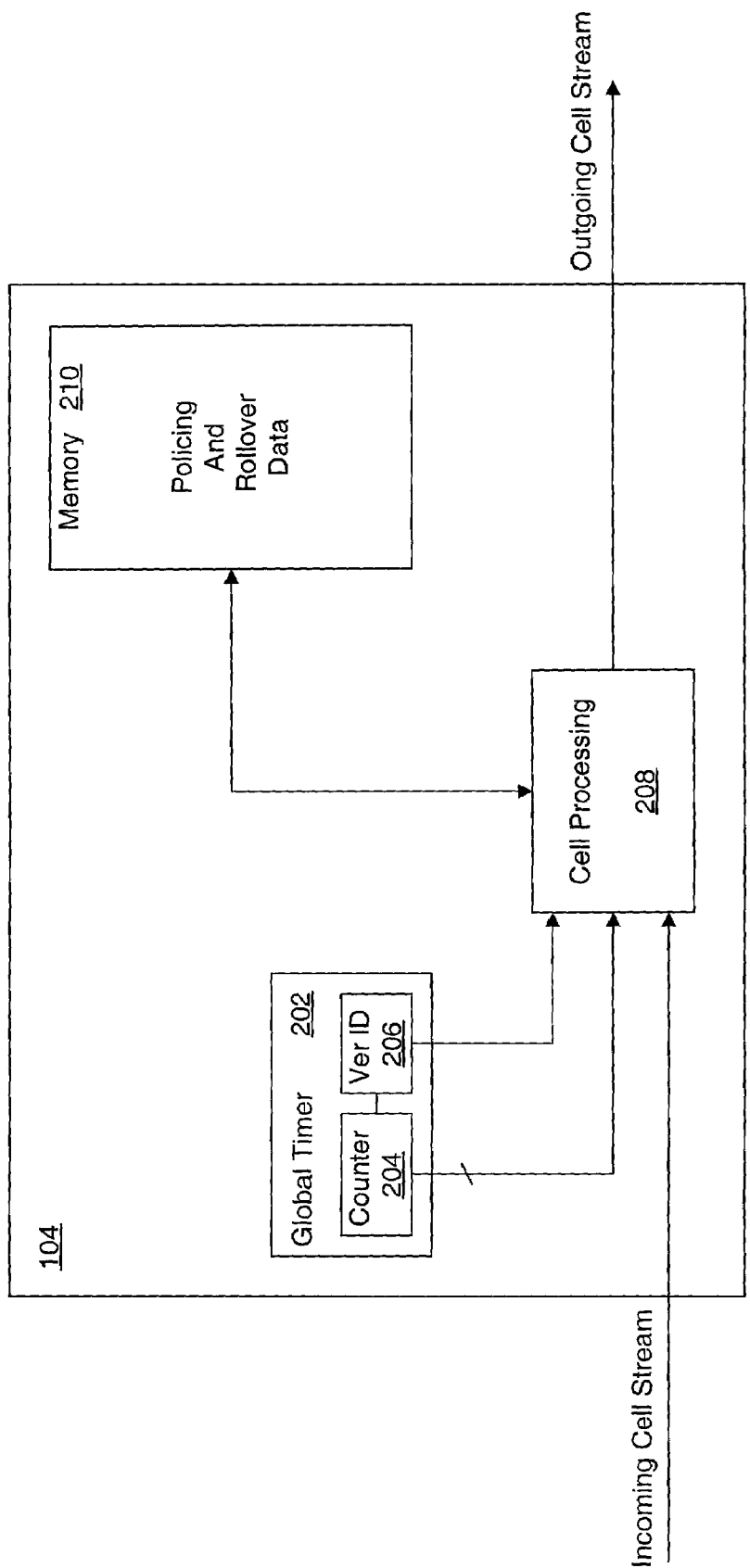
FIG. 2 is a block diagram of components that may be included within a network device for traffic policing, according to one embodiment.

Turning now to FIG. 2 a block diagram of components that may be included within a network device 104 for traffic policing is illustrated according to one embodiment. A network device 104 may include a global timer 202 for tracking elapsed time. Global timer 202 may include a counter 204 or other time measurement mechanism. For example, counter 204 may be a 32-bit counter which increments at a frequency according to a clock signal (not shown). The counter 204 may provide a time value to a cell processing unit 208. Regardless of the type of mechanism used to implement counter 204 the time value may have a maximum value. For example, counter 204 may be a 32-bit counter having a maximum count of 4,294,967,296 (FFFFFFFFh). The size of the maximum time or count value supplied by timer 204 is not critical in regard to the present invention. When the maximum value is reached, counter 204 rolls over and continues counting from zero. Thus, during operation, counter 204 may continuously count at a particular frequency up to a maximum value, roll over and continue.

Cell processing unit 208 monitors incoming cells for violations of an allowed negotiated or set cell rate for each channel handled by the network device 104. Cell processing unit 208 may access a memory 210 to obtain traffic policing parameters for each channel. Note that only components related to traffic policing are illustrated, however, the network device may include other components for routing or switching cells, some of which may be included in cell processing unit 208.

When cell processing unit 208 receives a cell it may access a location in memory 210 corresponding to the communication channel for the received cell. The memory location may store a theoretical arrival time and possibly other policing parameters for that communication channel. Cell processing unit 208 may compare the arrival time of the cell as provided by global timer 202 to the policing parameters from memory 210 in order to determine if the just-received cell is conforming to the particular cell rate for that communication channel. Cell processing unit 208 may then calculate a theoretical arrival time for the next cell to be received on that channel and store that theoretical arrival time value in the channel's location in memory 210. Due to implementation limitations, the theoretical arrival time values stored in memory 210 and calculated by cell processing unit 208 may have a maximum value size. For example, the theoretical arrival time may be calculated and stored as a 32-bit value in one embodiment. In other embodiments the maximum size of the theoretical arrival time may be larger or smaller than a 32-bit value. As the theoretical arrival time value is incremented by cell processing unit 208 as new cells are received, it may eventually reach the maximum value and rollover from zero—similar to the value provided by counter 204.

For ease of comparison, the arrival time supplied by counter 204 and the theoretical arrival time stored in memory 210 may both have the same maximum value size. However, if either the counter 204 or the theoretical arrival time for a particular channel has rolled over since the last cell was received for that channel, the fact that a rollover has occurred must be taken into account when the next cell is received to ensure a proper comparison. For example, if the theoretical arrival time value for a channel is large, for example FFFFFFFAh, and the timer counter rolls over, then the arrival time of a data unit may appear small, for example 000000005h. When the arrival time is compared to the allowed/theoretical arrival time, if rollover is not accounted for, the arrival time will appear to be less than the theoretical arrival time indicating that the data unit arrived too early (when in fact, in this example, it arrived eleven clocks after the allowed/theoretical arrival time). Similarly, if the allowed/theoretical arrival time is incremented beyond its max value so that it rolls over and a data unit arrives before the arrival time counter rolls over, it may appear that the data unit is conforming (since the arrival time appears to be greater than the allowed/theoretical arrival time), when in fact the data unit may have arrived too early.

To account for rollovers in the global timer value and the theoretical arrival time value, rollover data may be stored in memory 210 for each channel. The rollover data for each channel may indicate if the global timer value has rolled over ahead of the theoretical arrival time value, or if the theoretical arrival time value has rolled over ahead of the global timer value, or if the two values are in the same rollover phase. When a new cell is received, the cell processing unit 208 may access memory 210 to obtain the policing parameters and rollover data for that cell's channel. The rollover data may be used to ensure that any rollovers are taken into account when comparing the cell arrival time obtained from global timer 202 to the theoretical arrival time for the cell obtained from memory 210. For example, if the rollover data indicates that the global timer value has rolled over ahead of the theoretical arrival time value, then processing unit 208 knows to treat the arrival time value as being greater than the theoretical arrival time even though the 32-bit value from counter 204 may be smaller than the 32-bit theoretical arrival time value (note that 32-bit values are merely one example).

In response to either the counter 204 rolls over or the theoretical arrival time value calculated for a particular channel rolls over, the corresponding rollover data in memory 210 may be updated. As cell processing unit 208 calculates new theoretical arrival times for each channel it may update the rollover data in memory 210 for that channel as rollovers occur. However, a rollover by counter 204 may affect all channels handled by network device 104. A network device 104 may handle a large number of channels. For example, in one embodiment a network device 104 may be an ATM (Asynchronous Transfer Mode) switch handling 64K channels. When counter 204 rolls over it may take a certain amount of time to update the rollover data for each channel. New cells may be received before the rollover data has been updated for all channels after a global timer rollover. Global timer 202 may include version identifier (VerID) 206. The global timer version identifier 206 provides an indication of the current phase or version of the global timer. In one embodiment the global timer version ID 206 is a global register bit that is toggled each time counter 204 rolls over.

The rollover data stored in memory 210 for each channel may include an update version indicator to indicate whether or not the rollover data for that channel has been updated since the last global timer rollover. When a new cell is received, the update version from the rollover data for that channel may be compared to the global VerID bit 206 to determine if the rollover data is current. If the rollover data is current then cell processing unit 208 may proceed with its traffic policing function using the global timer value and policing parameters from memory 210. If the rollover data is not current then the rollover data is first updated to reflect that the global timer 202 has rolled over, and then cell processing unit 208 proceeds with traffic policing. In embodiments in which VerID 206 and the update version information of the rollover data are single bit values, then when counter 204 rolls over the rollover data for all channels is updated before another rollover of counter 204 occurs.

Figures 3, 8:
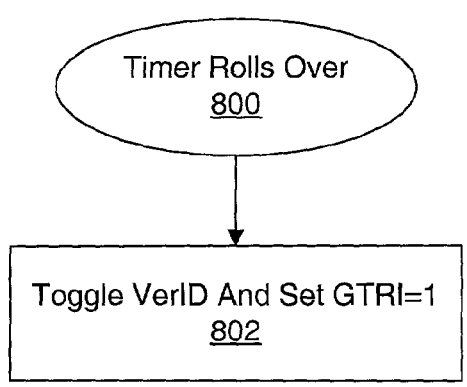
FIG. 3 illustrates policing parameter and rollover data entries in a memory table, according to one embodiment.
FIG. 8 illustrates a method for indicating global timer rollovers and rollover phase version in a network traffic policing device, according to one embodiment.

Turning now to FIG. 3, an example of entries in memory 210 for each channel is illustrated. Memory 210 may store policing parameters 302 and rollover data for each channel in table 300. For example, the policing parameters may include a theoretical arrival time value (TAT), an increment value (I) and a limit value (L). The theoretical arrival time may be calculated according to the cell rate that has been negotiated, set, or otherwise configured for the particular channel. For example, a channel may be a constant bit rate channel for which a maximum cell rate has been negotiated, e.g., 1K cells per second. The policing parameter I corresponds to the amount by which the theoretical arrival time may be incremented after each cell is received. For example, if the channel has a 1K cell/second rate, then I may equal one millisecond. The policing parameter L may represent a limit during which a cell may be received early and still be considered conforming. Thus, if a cell is received within L of the TAT it may be conforming.

A channel may also be a variable bit rate channel in which case a sustained cell rate (SCR), a peak cell rate (PCR), and a burst tolerance (BT) may have been negotiated or assigned. The sustained cell rate may indicate an average allowable cell rate over a long period of time. The peak cell rate may indicate a maximum cell rate for the channel. And the burst tolerance may indicate the maximum size of back-to-back cells that may be sent on the channel at the peak cell rate. The theoretical arrival time may be calculated according to these values to determine whether or not each incoming cell is conforming or non-conforming. An example of how theoretical arrival times may be calculated in one embodiment is according to the Asynchronous Transfer Mode standard as defined by the ATM forum and the ITU (International Telecommunications Union). See, e.g., Traffic Management Specification, Version 4.1, ATM Forum, March 1999; ITU-T Recommendation I.371, "Traffic Control and Congestion Control in B-ISDN," ITU-T Study Group 13, Geneva, August 1996; ITU-T Recommendation I.356, "B-ISDN ATM Layer Cell Transfer Performance," ITU-T Study Group 13, Geneva, October 1996; and ITU-T Recommendation I.361, "B-ISDN ATM Layer Specification," ITU-T Study Group 13, Geneva, November 1995. It is noted that the present invention may be adapted for other types of communication technologies besides ATM that employ traffic policing in which rollovers of arrival time and traffic parameter values are encountered, such as Frame Relay, IP Intserv, IP Diffserv, Multiprotocol Label Switching (MPLS), and Switched Multimegabit Data Services (SMDS).

Memory 210 may also store rollover data 304 for each channel. In one embodiment rollover data 304 may include an R bit, B bit, and V bit. The B bit is set to indicate that the current theoretical arrival time is behind the global timer phase. In other words the B bit is set when the global timer counter rolls over ahead of the theoretical arrival time. The R bit is set to indicate that the theoretical arrival time has rolled over ahead of the global timer. R and B are both set to zero to indicate that the theoretical arrival time and global timer are in the same rollover phase. The V bit indicates an update version for each channel. The V bit may be compared to the global VerID bit 206 to determine if the R and B bits for that channel have been updated according to the current phase of the global timer 202. Note that the R, B and V bits are only one example of an encoding to indicate the rollover relationship and/or update status. Any encoding or data representation may be employed that indicates the rollover relationship between the timer and theoretical arrival time. Such alternative representations may also indicate their update status. Note also that theoretical arrival time is only one example of the type of traffic for which rollover conditions may be handled according to the present invention.

Figure 4:
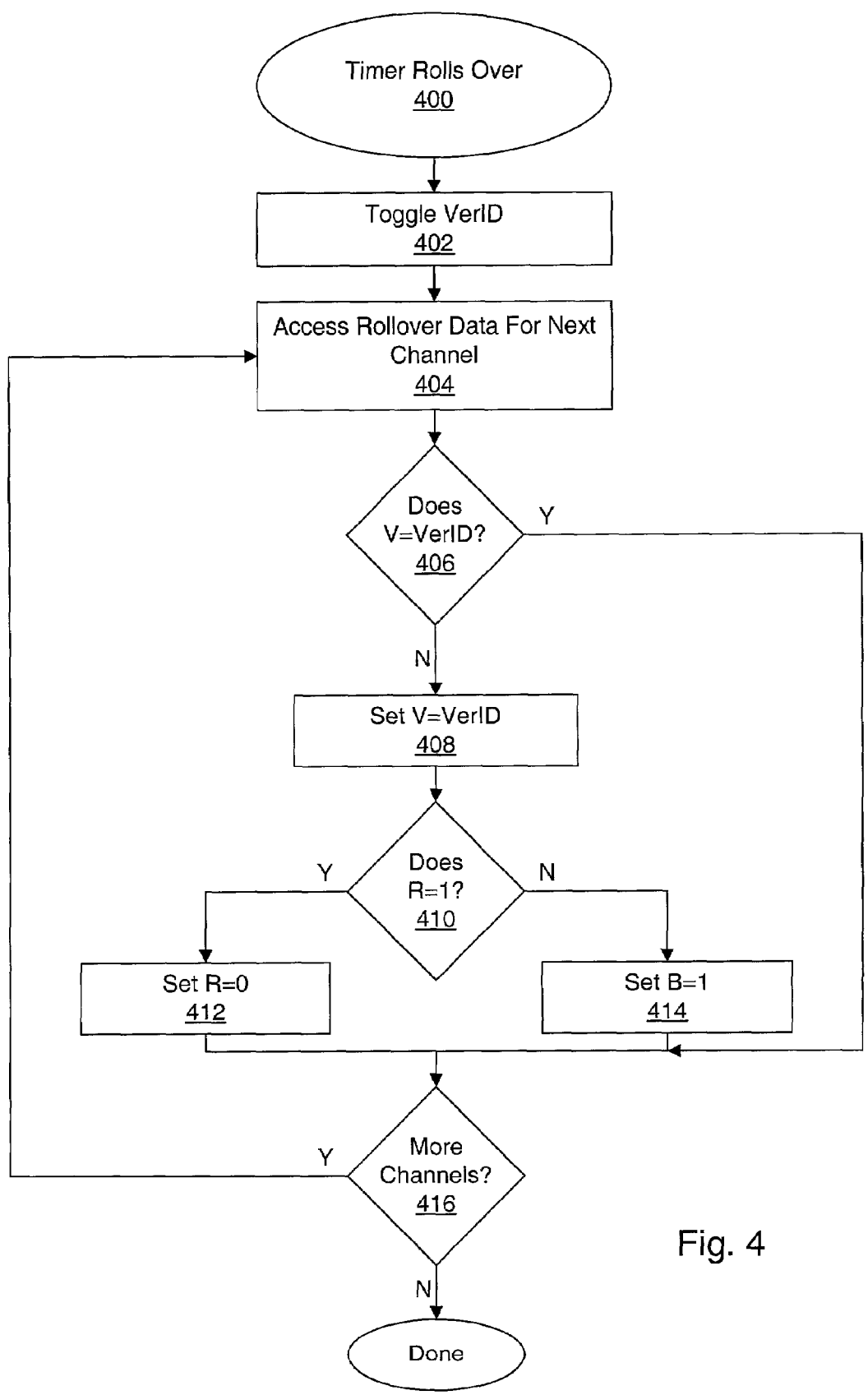
FIG. 4 illustrates a method for updating rollover data associated with each communication channel handled by a network device, according to one embodiment.

Turning now to FIG. 4 a method for updating the rollover data associated with each communication channel handled by a network device (e.g. switch) is illustrated. The method may be implemented by hardware, software, or a combination of hardware or software within a network device 104. In one embodiment, the method of FIG. 4 may be implemented as part of cell processing unit 208. The method functions to update the rollover data stored in memory 210 for each communication channel handled by the network device 104. In one embodiment this update process may be triggered each time global timer 202 rolls over. In other embodiments the update process may be performed independently of global timer rollovers as long as the update process is performed at least once for each phase of the global timer so that the global timer does not roll over twice before the rollover data entries for each channel are updated in memory 210.

In one embodiment when the global timer 202 rolls over, as indicated at 400, the global register bit VerID 206 is toggled as indicated at 402. Thus, the global register bit VerID 206 provides an indication of the current phase of the global timer. To perform the rollover data update, the rollover data for a channel is accessed from memory 210 as indicated at 404. The rollover data may include a V bit which indicates the phase of the global timer at the last time the rollover data for this channel was updated. The V bit is compared to the global VerID bit 206 as indicated at 406. If the V bit is equal to the VerID bit then the rollover data has already been updated for the current global timer phase. The process may then continue for the next channel as indicated at 416.

If the rollover data V bit is not equal to the VerID bit then the rollover data for that channel needs to be updated. The V bit is then set to equal the current VerID bit 206 to indicate that the rollover data for that channel is now updated, as indicated at 408. The rollover data may be updated by determining whether or not the R bit of the rollover data is set, as indicated at 410. If R is set then that indicates that the theoretical arrival time value had previously rolled over ahead of the global timer value. Now that the global timer has rolled over, the global timer and theoretical arrival time are both in the same phase. Thus, R is reset to zero, as indicated at 412, and the process may continue for the next channel, as indicated at 416. If R is not set then that indicates that either the global timer and theoretical arrival time were both previously in phase or that the theoretical arrival time was previously behind the global timer in rollover phase. Either way, now that the global timer has rolled over the theoretical arrival time is behind the global timer in rollover phase so B is set to one, as indicated at 414, to indicate that the theoretical arrival time for this channel is behind the global timer in rollover phase. The process then continues for the next channel as indicated at 416.

As mentioned above, the update process for rollover data for each channel may be triggered when the global timer rolls over. Alternatively the update process of 404 through 416 may be performed independently from global timer rollovers where rollover data for each channel is updated at least once per global timer rollover phase so that the global timer does not rollover twice before rollover data for any channel is updated.

Figure 5A:
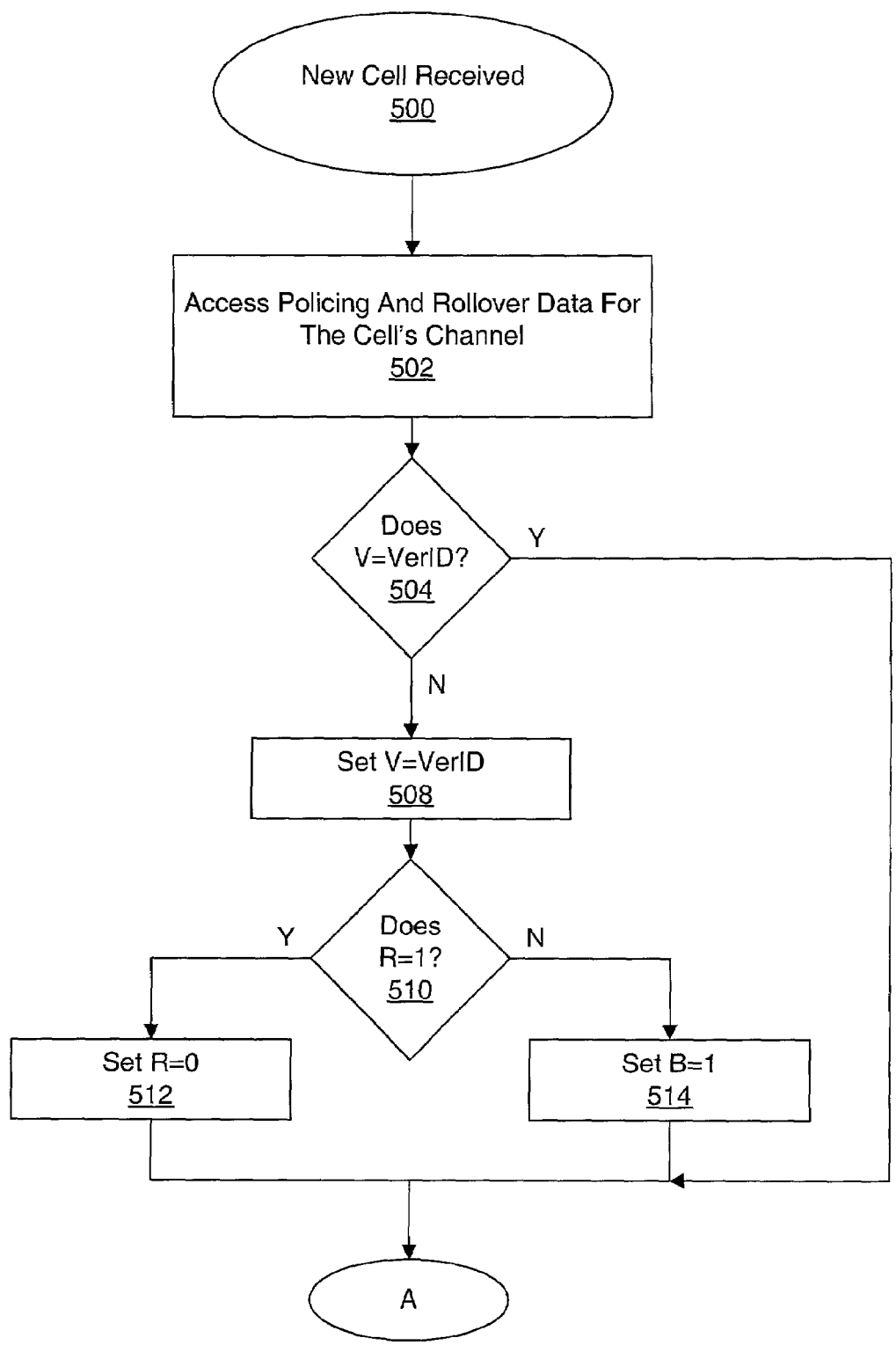
FIGS. 5A, 5B and 5C, illustrate a method for processing newly arrived cells in a network device which accounts for arrival time and policing parameter rollovers, according to one embodiment.
Figure 5B:
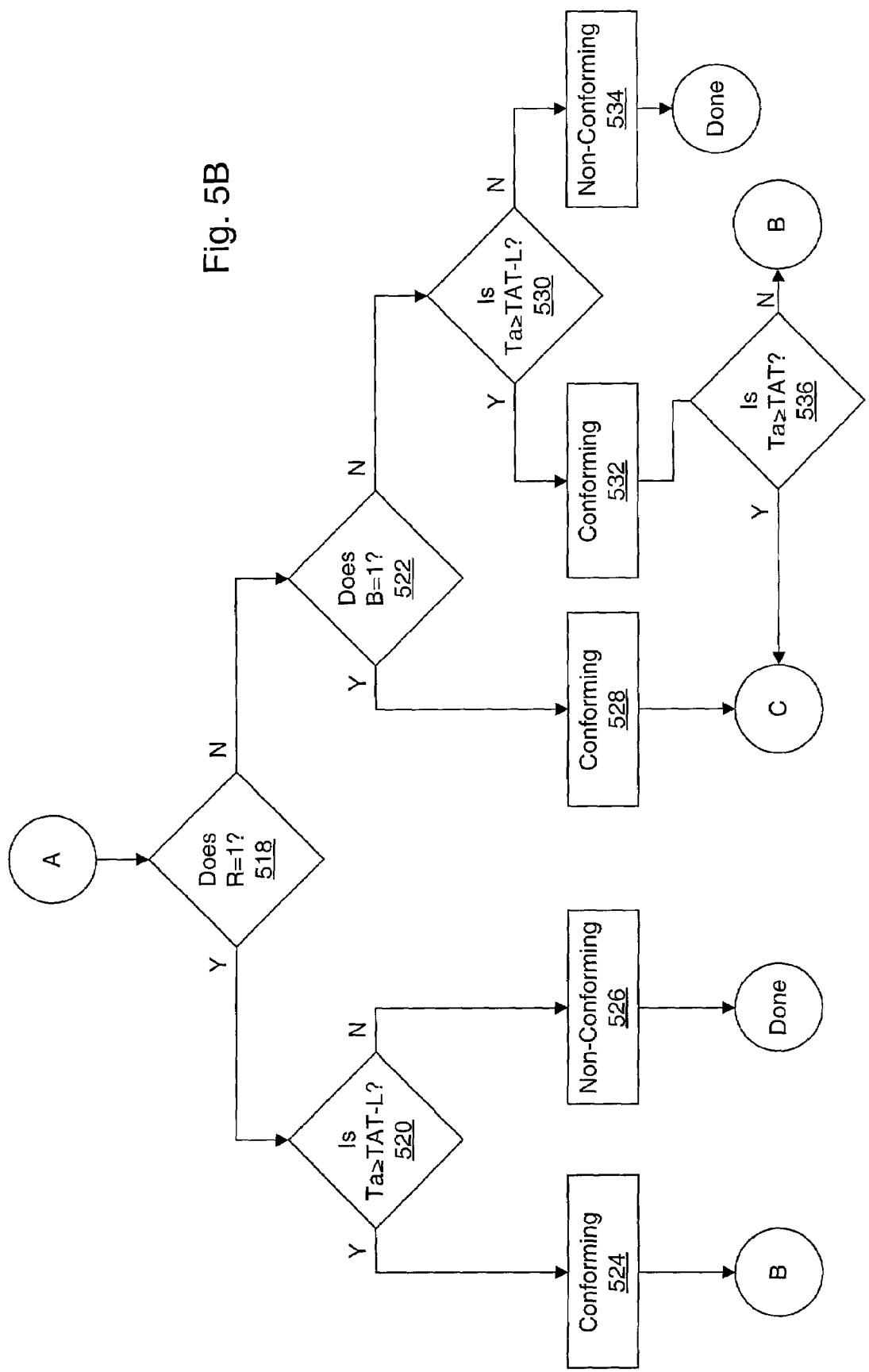
Figure 5C:
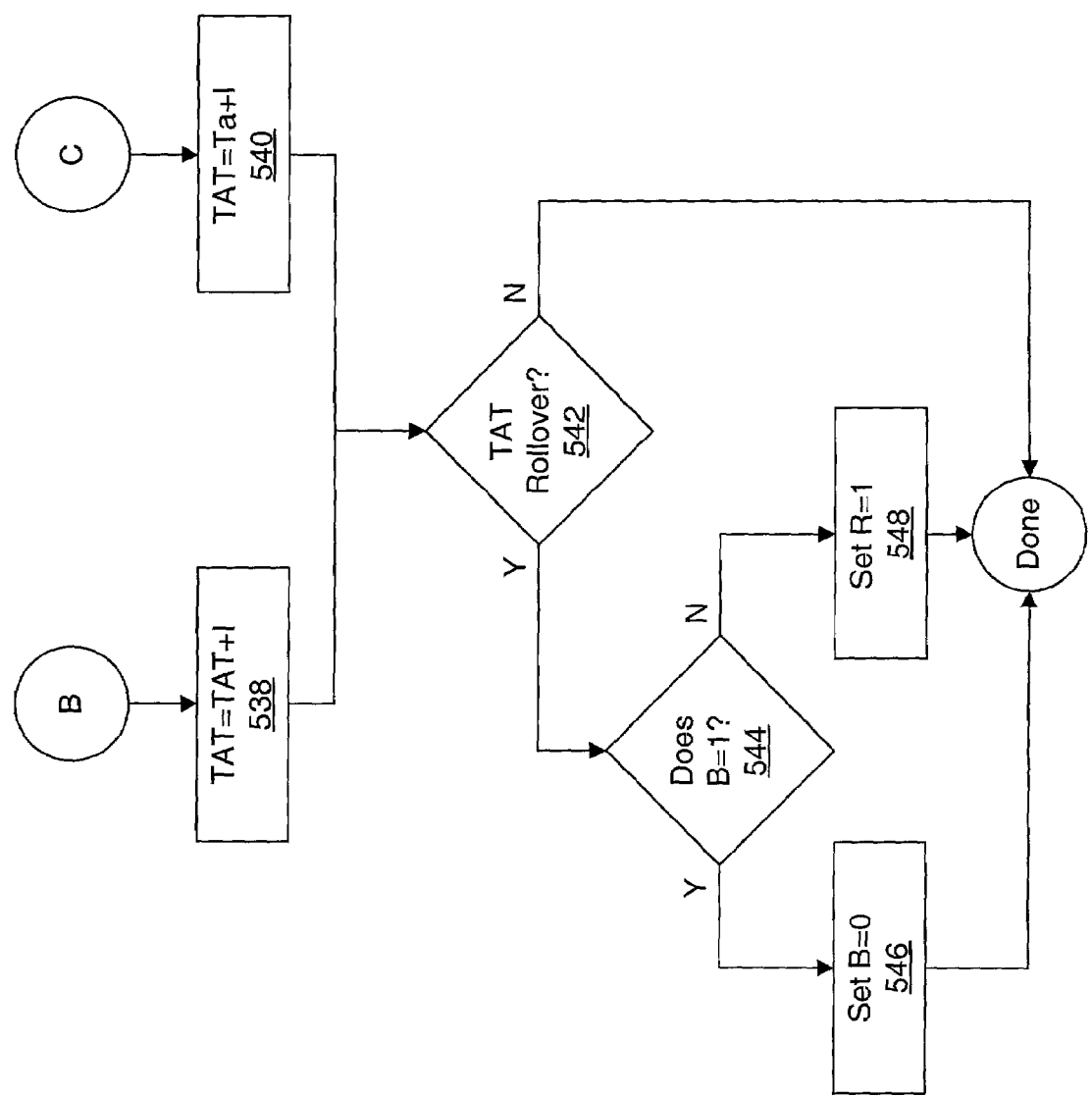

Turning now to FIGS. 5A–5C a method for processing newly arrived cells in a network device is illustrated which accounts for rollovers according to one embodiment. The method of FIGS. 5A–5C may be implemented by cell processing unit 208. When a new cell is received, as indicated at 500, the policing and rollover data for the channel on which the cell was received may be accessed, as indicated at 502. The method includes determining whether or not the rollover data has been updated for that channel, as indicated at 504. If the V bit of the rollover data is equal to the VerID global register bit 206 then the rollover data is current and cell processing continues as illustrated in FIG. 5B. If the rollover data is not current (V not equal to VerID) then the rollover data must first be updated before cell processing continues. The V bit is set to equal the global VerID bit as indicated at 508 and the R or B bit is updated as indicated at 510, 512 and 514.

When the rollover data has been updated for the cell's channel, cell processing continues as illustrated in FIG. 5B. The policing and rollover data may be used to determine if the received cell is conforming or non-conforming to the bandwidth established for the cell's channel. The R bit of the rollover data may be examined, as indicated at 518, to determine if the channel's theoretical arrival time value is ahead of the cell's arrival time (value from global timer 202). If R equals one, then the cell's arrival time was earlier than the theoretical arrival time since the theoretical arrival time is ahead of the global timer in rollover phase. According to one embodiment, the cell may be still be considered to be conforming if it arrived within a limit amount L from the theoretical arrival time. Thus, if the cell's arrival time is greater than or equal to the theoretical arrival time (taking rollover into account) minus L, then the cell may be considered conforming as indicated at 520 and 524. The theoretical arrival time is then updated for that channel, as shown in FIG. 5C. If the cell's arrival time is not greater than or equal to the theoretical arrival time minus L, then the cell has arrived too early and may be considered non-conforming as indicated at 520 and 526.

If R is not equal to one (at 518), then the B bit of the rollover data is examined as indicated at 522. If B is equal to one, then the channel's theoretical arrival time is behind the cell's arrival time (from global timer 202) in rollover phase. Thus, if B equals one, the cell has arrived after the theoretical arrival time for the cell's channel and the cell may be considered conforming, as indicated at 528. The theoretical arrival time for the cell's channel may then be updated, as shown in FIG. 5C. If B is not equal to one (at 522), then the cell's arrival time and the theoretical arrival time are in phase in regard to rollover. If the cell's arrival time is greater than or equal to the theoretical arrival time minus L, as indicated at 530, then the cell may be considered conforming, as indicated at 532. The channel's theoretical arrival time may then be updated, as indicated at 536 and in FIG. 5C. If the cell's theoretical arrival time is not greater than or equal to the theoretical arrival time minus L then the cell has arrived too early and may be considered non-conforming, as indicated at 534.

If a cell is considered conforming then normal cell processing may continue ¢for that cell as is appropriate for the particular network technology. For example, in one embodiment network device 104 may be an ATM switch. The ATM switch may be configured to handle multiple (e.g. 64K) ATM virtual channels. If a cell is considered non-conforming, the cell may be dropped. Alternatively, if the network device 104 (e.g. ATM switch) has sufficient bandwidth it may flag the cell as non-conforming and still continue processing of the cell. Later network devices receiving a flagged cell may then be free to drop the cell since it has already been determined to be non-conforming.

The theoretical arrival time is incremented for each channel as a conforming cell is processed, as shown in FIG. 5C. If the current theoretical arrival time for the channel is greater than the cell's arrival time then the theoretical arrival time is updated by adding an increment I to the current theoretical arrival time, as indicated at 538. If the cell's arrival is time is greater than or equal to the theoretical arrival time, then the theoretical arrival time is updated by setting the theoretical arrival time to equal the cell's arrival time plus the increment I, as indicated at 540. If updating the theoretical arrival time (538 or 540) causes the theoretical arrival time value to rollover, as indicated at 542, then the rollover data for that channel is updated to reflect the theoretical arrival time rollover. If the B bit equals one (indicating that the theoretical arrival time was behind the global timer in rollover phase) then B is reset to zero (546) to indicate that the theoretical arrival time and global timer are now in phase for this channel. If B is not equal to one (544) then R is set to one (548) to indicate that the theoretical arrival time has now rolled over ahead of the global timer.

As discussed in regard to FIG. 4, the rollover data for each communication channel handled by the network device is updated at least once per rollover phase of the global timer 202 in one embodiment. This rollover data update process may be a stand alone-process. However, in other embodiments the rollover data update process may be optionally performed as part of (or piggy-backed with) another process that is performed at least once per global timer rollover phase. For example, the network device 404 may also perform alarm and maintenance activities for each channel. The memory locations in memory 210 for each channel may also include alarm and maintenance data for each channel. An alarm and maintenance process may scan through the channel table in memory 210 reading and possibly modifying the alarm and maintenance data for each channel entry as it cycles through the channel table in memory 210. This alarm and maintenance channel table scan may be performed periodically at a rate so that it is performed at least once per global timer rollover phase. For example, in one embodiment the alarm and maintenance channel table scan is performed every 0.5 seconds and the global timer value may be from a 32 bit counter clocked at 100 megahertz which rolls over approximately once every 43 seconds. Thus, the rollover data update process may be performed as part of the alarm and maintenance channel table scan process.

Figure 6:
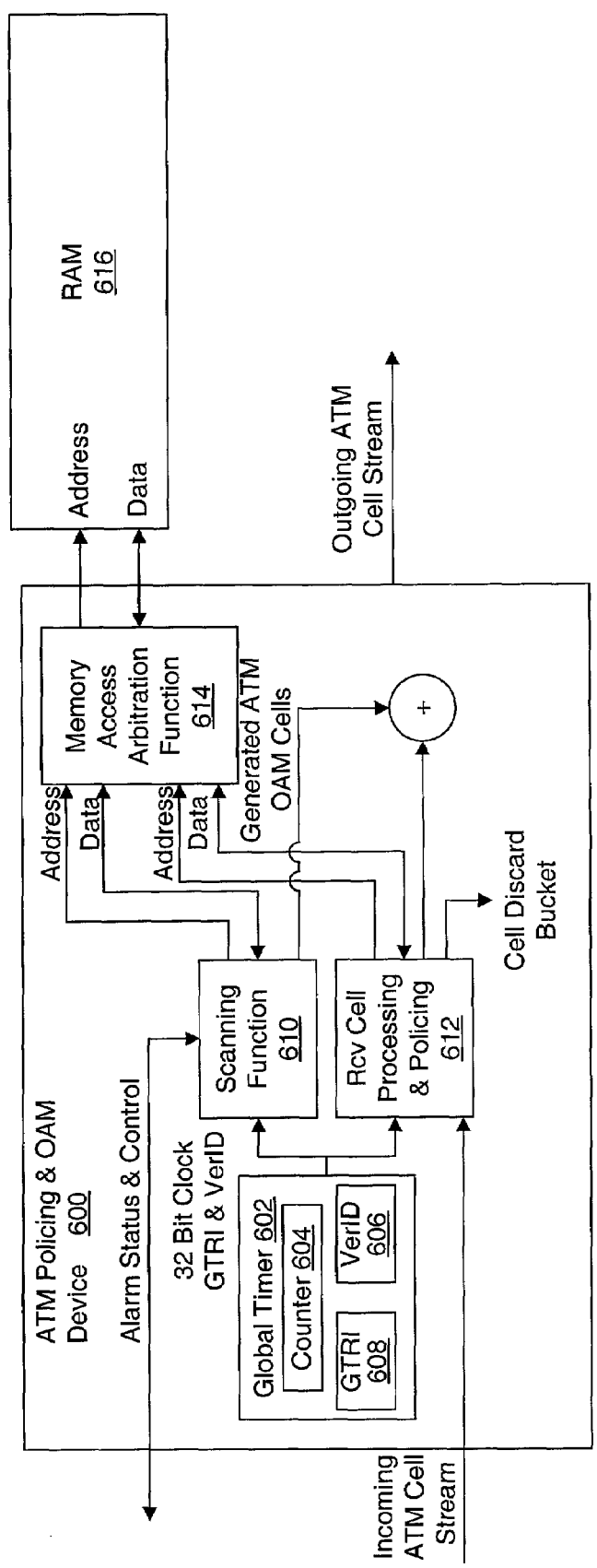
FIG. 6 illustrates a network device which may be configured to route or switch cells for a plurality of communication channels, according to one embodiment.

FIG. 6 illustrates a network device 600 which may be configured to route or switch cells for a plurality of communication channels. The network device 600 may include a scanning function unit 610 configured to perform alarm and maintenance activities for the plurality of communication channels. The scanning function unit 610 may also update rollover data for each channel as part of its alarm and maintenance scan function. The network device 600 may also include a cell processing and policing unit 612 configured to determine if incoming cells are conforming or non-conforming according to policing parameters for each channel. A memory arbitration unit 614 may be included for arbitrating access to memory 616 between scanning function unit 610 and cell processing and policing unit 612. A global timer 602 may provide a global timer value from counter 604 to the scanning function unit 610 and the cell processing and policing unit 612. The global timer 602 may also provide a global VerID bit 606 which indicates the current rollover phase of the global timer value. Global timer 602 may also provide a global timer rollover indicator (GTRI) 608. The global timer rollover indicator 608 may indicate if the global timer has rolled over since the last channel table scan was performed by scanning function unit 610. Note that VerID 606 and GTRI 608 may also be implemented separate from global timer 602. Memory 616 may include a channel table storing policing parameters, rollover data, and alarm and maintenance parameters for each channel.

FIG. 7 illustrates channel table 700 that may be stored in memory 616. The table may include policing parameters 702 and rollover data 704 for each channel. The policing parameters may include a theoretical arrival time, increment value, and limit value for each channel as described in regard to FIGS. 2–5C. The rollover data may include bits for indicating the rollover phase relationship of the global timer value and the theoretical arrival time for each channel and for indicating the update version of the rollover data for each channel, such as the R-B-V bits described in regard to FIGS. 2–5C. Each channel table entry may also include operation and maintenance data 706.

The operations and maintenance (OAM) data may be used by the network device to perform OAM functions to monitor the availability and performance of the communication channel connections. OAM functions may include Alarm Indication Signal (AIS), Remote Defect Indication (RDI), continuity check (CC), etc. When the network device detects a fault on a communication channel connection, it may generate and send an AIS signal in the continuing/forward direction to the next network device connected on the other end of the connection. Similarly when the network device receives an AIS on a communication channel, it may generate and send an RDI in the reverse/return direction to the network device connected on the other end of the connection. If the network device continues to detect a fault, it may generate and send the AIS periodically as long as the faults exist. In one embodiment, the AIS shall be sent at a rate of 1 AIS per second.

The OAM functions may be implemented by scanning the table in memory 616. In the table, there may be an AIS bit for each communication channel. When a table scan detects the AIS bit is set to 1, an AIS signal is generated for the communication channel. The table may be scanned periodically, for example at the rate of one round per second in one embodiment. During the table scanning process, the AIS bit of each communication channel is examined one by one. If AIS=1 is seen for a communication channel, an AIS is generated for that communication channel. When the network device detects faults, it sets the AIS bit in the table to 1 for all the communication channels that are affected. After the faults have been cleared, the network device may reset those AIS bits to 0. In one embodiment, the OAM functions are Asynchronous Transfer Mode (ATM) OAM functions as defined by the ATM Forum and/or International Telecommunications Union (ITU) ATM standards.

Figure 9:
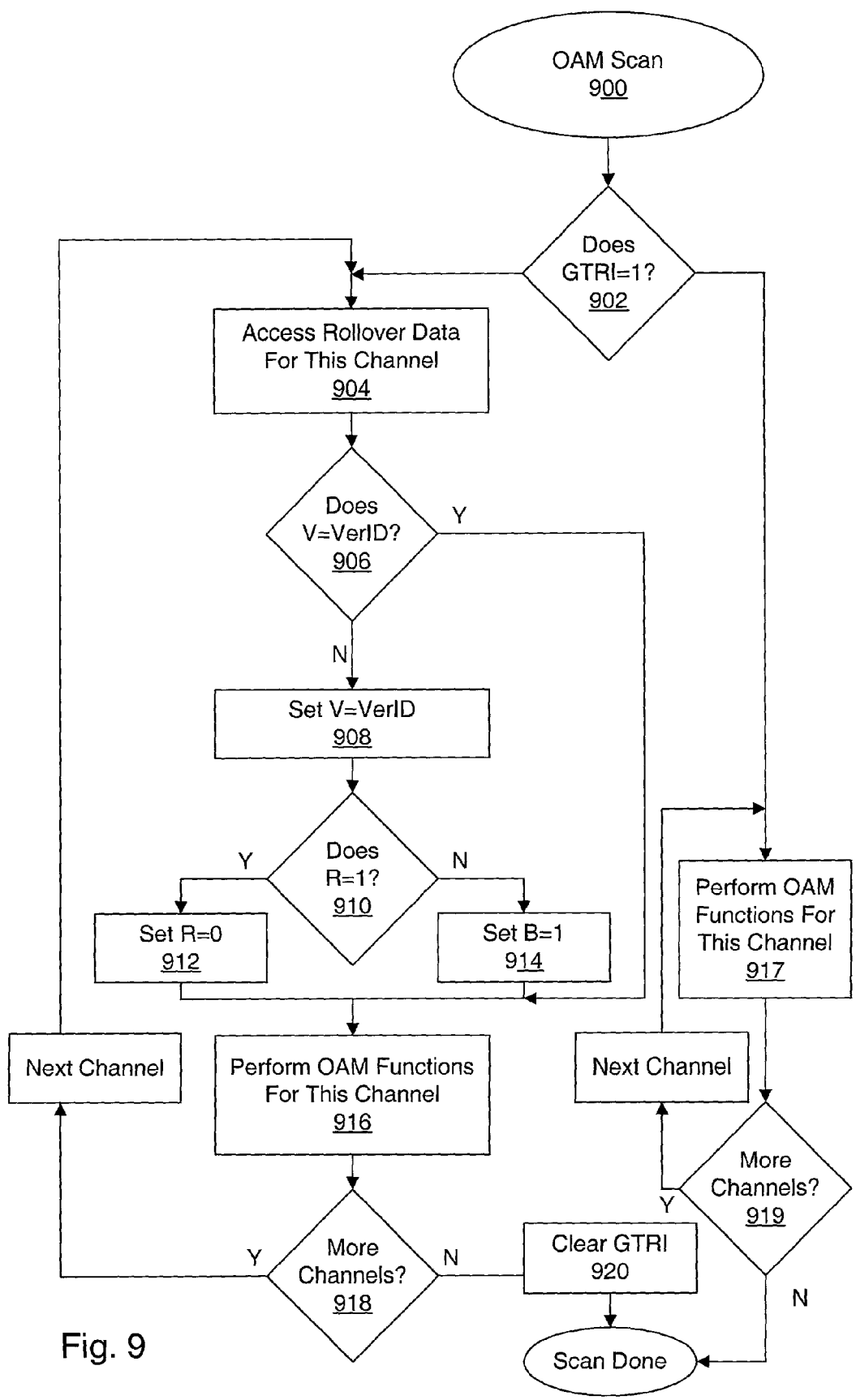
FIG. 9 illustrates an operation and maintenance scan which includes updating rollover data for each communication channel handled by a network device, according to one embodiment.

When the global timer value rolls over, the VerID 606 is toggled and the global timer rollover indicator 608 is set, as indicated at 800 and 802 in FIG. 8. As discussed above, scanning function unit 610 may perform an operations and maintenance (OAM) scan of the channel table in memory 616. This table scan may be performed at least once per global timer rollover phase. FIG. 9 illustrates an operation and maintenance scan which includes updating the rollover data for each channel. At the beginning of an operation and maintenance scan 900 the global timer rollover indicator 608 may be checked as indicated at 902. If the global timer rollover indicator 608 is not set then the regular operation and maintenance functions are performed for each channel as indicated at 917 and 919. If the global timer rollover indicator 608 is set then the rollover data may be updated (904, 906, 908, 910, 912 and 914) along with performing the operation and maintenance functions (916) for each channel (918). After the channel table in memory 616 has been completely scanned, the global timer rollover indicator 608 is cleared as indicated at 920. The rollover data update (904, 906, 908, 910, 912 and 914) may be performed as described in regard to 404, 406, 408, 410, 412 and 414 of FIG. 4.

In another embodiment, the global timer rollover indicator (GTRI) 608 may be checked during an operations and maintenance table scan before performing the operation and maintenance functions for each channel to determine whether or not a rollover data update needs to be performed. The current channel being scanned when the global timer rollover indicator 608 is first determined to be set may be marked and when the operations and maintenance scan cycles completely through the channel table back to the marked channel, the global timer rollover indicator 608 may be cleared.

The rollover data update and cell conformance processing may be summarized as follows.

```
(1) Initialization
R=0, B=0, TAT=Timer Value, V=VerID=0, GTRI=0.
(2) R-B-V Update
When the global timer rolls over, toggle VerID, set GTRI=1,
start to update R-B-V fields.
After the update is completed, reset GTRI=0
    If V=VerID, skip to next table entry
    If V=\=VerID, do the following.
    {V=VerID.
    If R=1, set R=0
    Else set B=1.}
(3) Conformation test
Let T_a be the arrival time of the current cell. If V=\=VerID,
update R-B-V first.
(3.1) If R=1, (TAT is ahead of T_a in clock phase which means that
T_a<TAT)
    If Ta>=TAT-L, conforming TAT=TAT+I.
    Else non-conforming
(3.2) If B=1, TAT is behind the T_a in clock phase.
    Conforming, B=0 and TAT=T_a+I,
(3.2) If R=0 and B=0, TAT and T_a are in the same clock phase.
    If T_a>=TAT-L
    {Conforming.
    If T_a>=TAT, TAT=T_a+I.
    Else TAT=TAT+I.
    }
    Else non-conforming.
(3.4) If TAT rolls over
    {If B=1, set B=0.
    Else set R=1
    }
```

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A network device, comprising:
   a cell processing unit configured to receive incoming data cells from a network for a plurality of communication channels;
   a timer configured to provide a timer value to said cell processing unit; and
   a memory coupled to said cell processing unit and configured to store one or more policing parameters and rollover data for each of the communication channels, wherein the rollover data comprises an indication of a rollover relationship between the timer value and one of the policing parameters for each of the communication channels;
   wherein for each received incoming data cell, said cell processing unit is configured to assign an arrival time from the timer value and compare the received incoming data cell's arrival time to the one or more policing parameters for the received incoming data cell's communication channel to determine if the received incoming data cell is conforming or non-conforming to a rate for the communication channel, wherein said cell processing unit is configured to access the rollover data for the received incoming data cell's communication channel to account for the rollover relationship when comparing the arrival time to the one or more policing parameters; and
   wherein said memory is further configured to store operations and maintenance data indicating connection availability information for each communication channel.

2. The network device as recited in claim 1, wherein said timer is configured to increment the timer value at a predetermined frequency, wherein the timer value rolls over to zero and continues incrementing upon reaching a maximum timer value, and wherein the one or more policing parameters comprise a theoretical arrival time, wherein said theoretical arrival time rolls over upon being incremented past a maximum value, and wherein the rollover data is configured to indicate for each communication channel whether or not the timer value and theoretical arrival time are in the same rollover phase.

3. The network device as recited in claim 2, further comprising:
   a timer rollover phase indicator configured to indicate a current rollover phase of the timer value; and
   wherein said cell processing unit is configured to access said memory to perform an update of the rollover data for each communication channel at least once per rollover phase of the timer value.

4. The network device as recited in claim 3, wherein for each communication channel the rollover data is further configured to indicate the rollover phase of the timer value the last time the rollover data was updated, wherein to perform the update of the rollover data for each communication channel the cell processing unit is configured to:
   compare the current rollover phase of the timer value to the rollover phase of the timer the last time the rollover data was updated;
   if the current rollover phase of the timer value is different than the rollover phase of the timer the last time the rollover data was updated, the cell processing unit is configured to:
      update the rollover data to indicate if the theoretical arrival time is ahead, behind, or in the same rollover phase as the timer value; and
      update the rollover data to indicate the current timer value rollover phase as the rollover phase of the timer value the last time the rollover data was updated.

5. The network device as recited in claim 4, wherein the timer rollover phase indicator comprises a global register bit configured to be toggled each time the timer value rolls over, and wherein for each communication channel, the rollover data comprises:
   two bits encoded to indicate that the theoretical arrival time value for the communication channel is ahead, behind or in the same rollover phase as the timer value; and
   a third bit configured to indicate the rollover phase of the timer value the last time the rollover data was updated.

6. The network device as recited in claim 3,
   wherein said cell processing unit is configured to perform a scanning function to scan the operations and maintenance data for the plurality of communication channels at least once per rollover phase of the timer value; and
   wherein said cell processing unit is configured to access said memory to perform the update of the rollover data for each communication channel as part of said scanning function.

7. The network device as recited in claim 6, wherein said cell processing unit is configured to perform said scanning function more frequently than once per roll over phase of the timer value, the network device further comprising:
- a timer rollover indicator configured to be set when the timer value rolls over;
- wherein said cell processing unit is configured to check the timer rollover indicator upon initiating the scanning function, wherein if the timer rollover indicator is set, the cell processing unit is configured to perform the update of the rollover data as the operations and maintenance data for each communication channel is scanned, and wherein if the timer rollover indicator is not set, the cell processing unit is configured to perform the scanning function without performing the update of the rollover data; and
- wherein the timer rollover indicator is cleared upon completing a scan in which the update of the rollover data is performed for each communication channel.

8. The network device as recited in claim 7, wherein for each communication channel the rollover data is further configured to indicate the rollover phase of the timer value the last time the rollover data was updated, wherein to perform the update of the rollover data for each communication channel the cell processing unit is configured to:
- compare the current rollover phase of the timer value to the rollover phase of the timer the last time the rollover data was updated;
- if the current rollover phase of the timer value is different than the rollover phase of the timer the last time the rollover data was updated, the cell processing unit is configured to:
  - update the rollover data to indicate if the theoretical arrival time is ahead, behind, or in the same rollover phase as the timer value; and
  - update the rollover data to indicate that the rollover phase of the timer value the last time the rollover data was updated is the current timer value rollover phase.

9. The network device as recited in claim 2, further comprising:
- a timer rollover phase indicator configured to indicate a current rollover phase of the timer value;
- wherein for each communication channel the rollover data is further configured to indicate the rollover phase of the timer value the last time the rollover data was updated;
- wherein for each received incoming data cell, before comparing the arrival time to the theoretical arrival time for the received incoming data cell's communication channel said cell processing unit is configured to compare the current rollover phase of the timer value to the rollover phase of the timer the last time the rollover data was updated, and if the current rollover phase of the timer value is different than the rollover phase of the timer the last time the rollover data was updated, update the rollover data in said memory for the received incoming data cell's communication channel.

10. The network device as recited in claim 9, wherein said cell processing unit is further configured to perform an update function at least once per rollover phase of the timer value, wherein the rollover data for each communication channel is updated by the update function if the current rollover phase of the timer value is different than the rollover phase of the timer the last time the rollover data was updated.

11. The network device as recited in claim 10, wherein for each communication channel, the rollover data comprises:
- a bit R, wherein R is set to indicate that the theoretical arrival time value for the communication channel is ahead of the timer value in rollover phase;
- a bit B, wherein B is set to indicate that the theoretical arrival time value for the communication channel is behind the timer value in rollover phase, wherein R and B are both cleared to indicate that the theoretical arrival time value for the communication channel and the timer value are in the same rollover phase; and
- a bit V, wherein V indicates the rollover phase of the timer value the last time the rollover data was updated.

12. The network device as recited in claim 11, wherein the one or more policing parameters further comprise a limit value, wherein for each received incoming data cell, the cell processing unit is configured to compare the received incoming data cell's arrival time to the one or more policing parameters by accessing the rollover data and policing parameters for the received incoming data cell's communication channel, wherein the received incoming data cell is conforming if:
- R is set and the cell's arrival time is greater than or equal to the theoretical arrival time minus the limit value, taking into account that the theoretical arrival time is ahead of the cell's arrival time in rollover phase; or
- R is not set and B is set; or
- R and B are both not set and the cell's arrival time is greater than or equal to the theoretical arrival time minus the limit value.

13. The network device as recited in claim 12, wherein the received incoming data cell is non-conforming if:
- R is set and the cell's arrival time is less than the theoretical arrival time minus the limit value, taking into account that the theoretical arrival time is ahead of the cell's arrival time in rollover phase; or
- R and B are both not set and the cell's arrival time is less than the theoretical arrival time minus the limit value.

14. The network device as recited in claim 13, wherein the one or more policing parameters further comprise an increment value, wherein for each received incoming data cell, said cell processing unit is configured to increment the theoretical arrival time for the received incoming data cell's communication channel after determining that the cell is conforming, wherein if the cell is conforming the theoretical arrival time is set to:
- the current theoretical arrival time plus the increment value if R is set or if R is not set and the cell's arrival time is less than the current theoretical arrival time; or
- the cell's arrival time plus the increment value if R is not set and the cell's arrival time is greater than or equal to the current theoretical arrival time.

15. The network device as recited in claim 14, wherein said cell processing unit is further configured to update the rollover data if the theoretical arrival time for one of the communication channels is incremented past its maximum value so that it rolls over, wherein B is cleared if B was set when the theoretical arrival time rolled over, and R is set if B was not set when the theoretical arrival time rolled over.

16. The network device as recited in claim 1, wherein the network device is configured as an Asynchronous Transfer Mode (ATM) switch for the plurality of communication channels, wherein each communication channel is an ATM virtual channel.

17. A method, comprising:

receiving incoming data cells from a network for a plurality of communication channels, wherein each received incoming data cell has an arrival time from a timer value;

for each received incoming data cell, accessing one or more policing parameters and rollover data for the communication channel on which the incoming data cell was received, wherein the rollover data comprises an indication of a rollover relationship between the timer value and one of the policing parameters for each of the communication channels;

for each received incoming data cell, comparing the received incoming data cell's arrival time to the one or more policing parameters for the received incoming data cell's communication channel to determine if the received incoming data cell is conforming or non-conforming to a rate for the communication channel, wherein said comparing comprises using the rollover data for the received incoming data cell's communication channel to account for the rollover relationship between the arrival time and the one or more policing; and storing operations and maintenance data indicating connection availability information for each of the plurality of communication channels.

18. The method as recited in claim 17, further comprising:

incrementing the timer value at a predetermined frequency, wherein the timer value rolls over to zero and continues incrementing upon reaching a maximum timer value; and wherein the one or more policing parameters comprise a theoretical arrival time, wherein said theoretical arrival time rolls over upon being incremented past a maximum value, and wherein the rollover data is configured to indicate for each communication channel whether or not the timer value and theoretical arrival time are in the same rollover phase.

19. The method as recited in claim 18, further comprising:

indicating a current rollover phase of the timer value; and updating the rollover data for each communication channel at least once per rollover phase of the timer value.

20. The method as recited in claim 19, wherein for each communication channel the rollover data is further configured to indicate the rollover phase of the timer value the last time the rollover data was updated, wherein said updating the rollover data for each communication channel comprises:

comparing the current rollover phase of the timer value to the rollover phase of the timer the last time the rollover data was updated;

if the current rollover phase of the timer value is different than the rollover phase of the timer the last time the rollover data was updated:

updating the rollover data to indicate if the theoretical arrival time is ahead, behind, or in the same rollover phase as the timer value; and updating the rollover data to indicate the current timer value rollover phase as the rollover phase of the timer value the last time the rollover data was updated.

21. The method as recited in claim 20, wherein said indicating a current rollover phase of the timer value comprises toggling a global register bit each time the timer value rolls over, and wherein for each communication channel, the rollover data comprises:

a bit R, wherein R is set to indicate that the theoretical arrival time value for the communication channel is ahead of the timer value in rollover phase;

a bit B, wherein B is set to indicate that the theoretical arrival time value for the communication channel is behind the timer value in rollover phase, wherein R and B are both cleared to indicate that the theoretical arrival time value for the communication channel and the timer value are in the same rollover phase; and a bit V, wherein V indicates the rollover phase of the timer value the last time the rollover data was updated.

22. The method as recited in claim 19, further comprising:

wherein said performance parameters, said rollover data and said operations and maintenance data are all stored in a table having an entry for each communication channel;

performing a scanning function to scan the operations and maintenance data in the table for the plurality of communication channels at least once per rollover phase of the timer value; and wherein said updating the rollover data is performed as part of said scanning function.

23. The method as recited in claim 22, further comprising:

setting a timer rollover indicator when the timer value rolls over; and wherein said scanning function is performed more frequently than once per roll over phase of the timer value, wherein said performing a scanning function comprises:

checking the timer rollover indicator upon initiating the scanning function:

wherein if the timer rollover indicator is set, performing said updating the rollover data with the scanning function for each communication channel; and wherein if the timer rollover indicator is not set, the scanning function is performed without updating the rollover data; and clearing the timer rollover indicator upon completing the scan function for each communication channel in which said updating the rollover data is performed for each communication channel.

24. The method as recited in claim 23, wherein for each communication channel the rollover data is further configured to indicate the rollover phase of the timer value the last time the rollover data was updated, wherein said updating the rollover data comprises:

comparing the current rollover phase of the timer value to the rollover phase of the timer the last time the rollover data was updated;

if the current rollover phase of the timer value is different than the rollover phase of the timer the last time the rollover data was updated:

updating the rollover data to indicate if the theoretical arrival time is ahead, behind, or in the same rollover phase as the timer value; and updating the rollover data to indicate the current timer value rollover phase as the rollover phase of the timer value the last time the rollover data was updated.

25. The method as recited in claim 18, further comprising:

indicating a current rollover phase of the timer value;

wherein, for each communication channel the rollover data is further configured to indicate the rollover phase of the timer value the last time the rollover data was updated;

before said comparing the received incoming data cell's arrival time to the one or more policing parameters for each received incoming data cell, comparing the current rollover phase of the timer value to the rollover phase of the timer the last time the rollover data was updated, and if the current rollover phase of the timer value is different than the rollover phase of the timer the last time the rollover data was updated, updating the rollover data for the received incoming data cell's communication channel.

26. The method as recited in claim 25, further comprising updating the rollover data for each communication channel at least once per rollover phase of the timer value, wherein said updating the rollover data for each communication channel at least once per rollover phase of the timer value comprises:

checking for each communication channel if the current rollover phase of the timer value is different than the rollover phase of the timer the last time the rollover data was updated;

if the current rollover phase of the timer value is different than the rollover phase of the timer the last time the rollover data was updated, modifying the rollover data for that communication channel to reflect the current phase relationship between the timer value and theoretical arrival time; and if the current rollover phase of the timer value is not different than the rollover phase of the timer the last time the rollover data was updated, leaving the rollover data for that communication channel unmodified.

27. The method as recited in claim 26, wherein for each communication channel, the rollover data comprises:

a bit R, wherein R is set to indicate that the theoretical arrival time value for the communication channel is ahead of the timer value in rollover phase;

a bit B, wherein B is set to indicate that the theoretical arrival time value for the communication channel is behind the timer value in rollover phase, wherein R and B are both cleared to indicate that the theoretical arrival time value for the communication channel and the timer value are in the same rollover phase; and a bit V, wherein V indicates the rollover phase of the timer value the last time the rollover data was updated.

28. The method as recited in claim 27, wherein the one or more policing parameters further comprise a limit value, wherein said comparing the received incoming data cell's arrival time to the one or more policing parameters for each received incoming data cell comprises determining the received incoming data cell to be conforming if:

R is set and the cell's arrival time is greater than or equal to the theoretical arrival time minus the limit value, taking into account that the theoretical arrival time is ahead of the cell's arrival time in rollover phase; or R is not set and B is set; or R and B are both not set and the cell's arrival time is greater than or equal to the theoretical arrival time minus the limit value.

29. The method as recited in claim 28, wherein said comparing the received incoming data cell's arrival time to the one or more policing parameters for each received incoming data cell further comprises determining the received incoming data cell to be non-conforming if:

R is set and the cell's arrival time is less than the theoretical arrival time minus the limit value, taking into account that the theoretical arrival time is ahead of the cell's arrival time in rollover phase; or R and B are both not set and the cell's arrival time is less than the theoretical arrival time minus the limit value.

30. The method as recited in claim 29, wherein the one or more policing parameters further comprise an increment value, the method further comprising:

for each received incoming data cell, if the received incoming data cell is found to be conforming, setting the theoretical arrival time for that cell's communication channel to:

the current theoretical arrival time plus the increment value if R is set or if R is not set and the cell's arrival time is less than the current theoretical arrival time; or the cell's arrival time plus the increment value if R is not set and the cell's arrival time is greater than or equal to the current theoretical arrival time.

31. The method as recited in claim 30, wherein said setting the theoretical arrival time further comprises updating the rollover data if the theoretical arrival time is incremented past its maximum value so that it rolls over, wherein B is cleared if B was set when the theoretical arrival time rolled over, and R is set if B was not set when the theoretical arrival time rolled over.

32. The method as recited in claim 17, wherein each communication channel is an Asynchronous Transfer Mode (ATM) virtual channel.

* * * * *

UNITED STATES PATENT AND TRADEMARK OFFICE
CERTIFICATE OF CORRECTION

PATENT NO. : 7,126,911 B2 Page 1 of 1
APPLICATION NO. : 09/923221
DATED : October 24, 2006
INVENTOR(S) : Yongdong Zhao and Craig A. Lindahl It is certified that error appears in the above-identified patent and that said Letters Patent is hereby corrected as shown below:

In the Claims:

Col. 17, line 22, after "one or more policing", please insert --parameters--.

Signed and Sealed this

Ninth Day of January, 2007

JON W. DUDAS
*Director of the United States Patent and Trademark Office*